United States Patent [19]

Koeniger

[11] Patent Number: 4,697,382
[45] Date of Patent: Oct. 6, 1987

[54] DEVICE FOR GROWING PLANTS AT AN ABNORMAL GROWTH RATE IN A CONTAINER

[75] Inventor: Martin Koeniger, Aalen-Wasseralfingen, Fed. Rep. of Germany

[73] Assignee: Firma Hermann Koeniger, Aalen, Fed. Rep. of Germany

[21] Appl. No.: 917,255

[22] Filed: Oct. 8, 1986

Related U.S. Application Data

[63] Continuation of Ser. No. 707,064, Mar. 1, 1985, abandoned.

[30] Foreign Application Priority Data

Mar. 8, 1984 [DE] Fed. Rep. of Germany ....... 3408479

[51] Int. Cl.$^4$ .............................................. A01G 9/02
[52] U.S. Cl. .............................................. 47/66; 47/73
[58] Field of Search .................. 47/77, 75, 73, 66, 59, 47/63, 86, 74, 78, 48.5, 57.5; 211/74, 71; 248/97; 405/232, 245–246, 253

[56] References Cited

U.S. PATENT DOCUMENTS

| | | | |
|---|---|---|---|
| 344,814 | 7/1886 | Carsley | 47/73 |
| 2,942,823 | 6/1960 | Chapman | 47/78 X |
| 2,982,420 | 5/1961 | Wannemacher | 211/74 |
| 3,134,196 | 5/1964 | Hansen | 47/74 |
| 3,415,012 | 12/1968 | Stubbman | 47/78 |
| 3,460,562 | 8/1969 | Moulder | 47/48.5 X |
| 3,799,426 | 3/1974 | Pates et al. | 47/73 X |
| 3,914,900 | 10/1975 | Bigelow et al. | 47/48.5 |
| 4,008,544 | 2/1977 | Rupprecht et al. | 47/77 |
| 4,096,662 | 6/1978 | Anderson | 47/78 X |
| 4,098,021 | 7/1978 | Gruber | |
| 4,142,324 | 3/1979 | Magyar | 47/78 X |
| 4,336,669 | 6/1982 | Gordon | 47/74 |
| 4,488,697 | 12/1984 | Garvey | 248/97 X |

FOREIGN PATENT DOCUMENTS

| | | | |
|---|---|---|---|
| 172524 | 9/1952 | Austria | 47/77 |
| 2602107 | 3/1977 | Fed. Rep. of Germany | 47/66 |
| 2744143 | 9/1977 | Fed. Rep. of Germany | . |
| 3047818 | 12/1980 | Fed. Rep. of Germany | . |
| 2312191 | 1/1977 | France | 47/77 |
| 7909047 | 7/1981 | Netherlands | 47/77 |
| WO/01460 | 5/1982 | World Int. Prop. O. | 47/73 |

Primary Examiner—Robert A. Haffer
Assistant Examiner—Danton DeMille
Attorney, Agent, or Firm—Hayes, Davis & Soloway

[57] ABSTRACT

A device for growing plants at an abnormal growth rate in a container (9), which has entirely or partially perforated walls and an aperture in the growing direction of the plant, has the shape of a pouch with at least one stiffening strap (10). The container (9) is surrounded by a guide member (1) having a guide frame (2) adapted to the curve of the stiffening strap (10) adjusted therein and having at the upper end an annular lip (3) in the aperture of which said container (9) is fitted. In the aperture of the annular lip (3) can be inserted a clamping ring (13) by which the upper edge of the container (9) is clamped between said ring and the inner wall of the annular lip (3).

14 Claims, 11 Drawing Figures

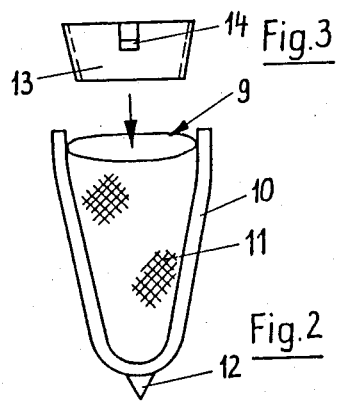
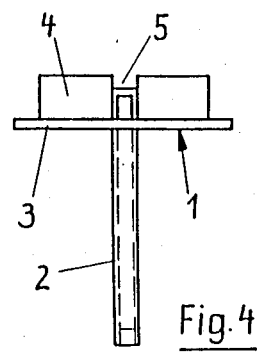
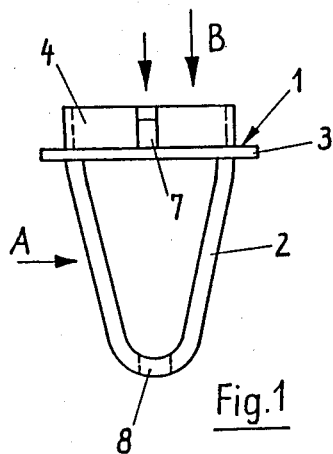
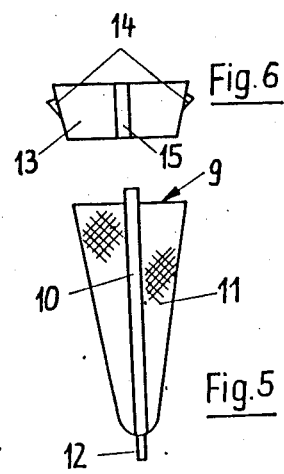

DEVICE FOR GROWING PLANTS AT AN ABNORMAL GROWTH RATE IN A CONTAINER

This is a continuation of co-pending application Ser. No. 707,064 filed on Mar. 1, 1985 now abandoned.

The invention concerns a device for growing plants at an abnormal growth rate, the device having a container having entirely or partially perforated walls and an aperture in the direction of growth of the plant, said container being shaped as a pouch with at least one stiffening strap.

A prior art device of this general kind has been described in German Patent No. 3,047,818.

This device or container serves for growing plants of minimal growth rate such as has been described, for instance, in German Patent No. 2,602,107. In German Patent No, 2,744,143 there has been described a method for growing plants with normal growth above the soil, but with a reduced root volume and a container for applying said method.

In said known publications the containers used substantially comprise pouches having walls that are almost entirely perforated. The containers described in German Patent No. 2,602,107 and German Patent No. 2,744,143 substantially differ only by their size. For growing plants with normal growth above the soil and abnormal growth beneath the soil surface, said containers will be in general larger than 51 cm$^3$ and be within a range of from 51 cm$^3$ to about 100 liters. Occasionally they may have larger volumes. In German Patent No. 2,602,107 there are used, on the other hand, containers having a volume of generally less than 51 cm$^3$. In this manner there is obtained not only an abornally low growth rate beneath the soil surface but also a very considerable limitation in the growth rate of the plants above the soil.

However, in the containers known already it is disadvantageous that when handled they are somewhat complicated and not stable enough. It is true that in German Patent No. 3,047,818 there has already been proposed a container provided with reinforcements in the form of a strap, but since the pouch is flat when not in use, it has to be opened before being used so that soil and seeds can be poured in. It is also disadvantageous that with certain plants there is the danger that the roots, which in their expansion and growth must remain confined to the interior of the container, will grow out upwardly.

This invention is therefore based on the problem of providing a device of the kind mentioned above that is simple to manipulate and very stable and in which the growing of roots beyond the upper aperture is prevented as far as possible. Besides, this device must be adequate for mass utilization.

According to the invention this problem is solved by the fact that the container is surrounded by a guide member that has a guide frame adapted to the curve of the stiffening strap adjusted therein and which has on the upper end an annular lip in the aperture of which the container is fitted.

By the development according to the invention a relatively great stability is obtained the pouch-like container is kept by the annular lip in a shape correct for utilization, that is substantially a circular shape.

A very advantageous further development of the invention consists in that there is inserted in the aperture of the annular lip in a clamping ring whereby the upper edge of the container is clamped between the latter and the inner wall of the annular lip.

With the clamping ring according to the invention, the pouch-like container is securely held in the correct open position by the firm clamping of its upper edge.

For a better control it can be arranged that the annular lip be provided with an adapter ring having an internal diameter that corresponds, at least approximately, to the internal diameter of the aperture of the annular lip.

From this feature there result a better contact surface for the upper edge of the container and also a longer clamping surface for the clamping ring.

To enable the container to be exactly and compactly inserted in the guide member, the adapter ring can have slits and the annular lip recesses on the internal diameter for passage of the stiffening strap of the container.

A firmer fastening of the clamping ring on the guide member results when the clamping ring is provided on the external periphery with projections and the adapter ring with apertures or recesses, the projections being snapped into the apertures or recesses.

Another very advantageous development of the invention consists in that the annular lip has a larger external diameter than the container together with the stiffening strap.

It is true that the roots of the plants in most cases are prevented from growing out through the upper annular lip and in some cases also through the adapter ring, but specially in the case of plants having a very intensive root formation, which under certain circumstances even form air roots, it is advantageous if the annular lip is upwardly lengthened. It is thus obtained that no soil compound be present in the area of the upper aperture. Thereby the roots receive no moisture and cannot creep out of the aperture.

A reliable and simple direction of the stiffening strap is given when the guide frame of the guide member, seen in cross section, has a U-shaped profile in the interior space of which the stiffening strap is situated.

There is generally laid around the pouch-like container a U-shaped stiffening strap that can be a round, square or polygonal rod in cross-section.

For more easily introducing the device into the ground it is advantageous if the container or the guide frame of the guide member has a downwardly oriented tip in the lower area.

For this purpose it can be arranged that the stiffening strap of the container be provided at the lower end of the tip and that the guide frame of the guide member has at the lower end a slit for passage of the tip. The tip can be of any shape desired. A triangular shape with a downwardly projecting triangular tip is preferably used.

The invention will now be described, by way of example, with reference to the accompanying drawings, in which:

FIG. 1 is a side view of the guide member;

FIG. 2 is a side view of the pouch-like container;

FIG. 3 is a side view of the clamping ring;

FIG. 4 is a side view of the guide member viewed from the direction of arrow A of FIG. 1;

FIG. 5 is a side view of the pouch-like container viewed from the same direction;

FIG. 6 is a side view of the clamping ring viewed from the same lateral direction;

Figure 11:
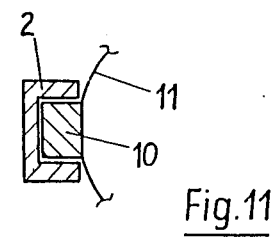
FIG. 11 is a section along line XI—XI of FIG. 9 in cutout enlargement.

In FIG. 1 the guide member 1 is shown with a strap-like guide frame 2, which seen in cross section has a U-shaped profile (See FIG. 11). The guide frame 2 is secured by its two legs on the upper end to an annular lip 3. Starting from the annular lip 3, an adapter ring 4 extends upwardly. Guide frame 2, annular lip 3 and adapter ring 4 can be made in one piece, for instance, of synthetic material, but if necessary they can also be separate parts.

The adapter ring 4 is provided with slits 5 on opposite sides in the area of the guide frame 2. The annular lip 3 likewise has in this area recesses 6. Apertures 7 in ring 4 are each offset 90° with respect to the slits 5 and recesses 6.

An opening 8 is situated at the lower end of the guide frame 2.

In FIGS. 2 and 5 is shown a pouch-like container 9. It essentially comprises a stiffening strap 10 formed in a U-shape to which is secured, glued, for instance, a sieve 11 that forms the pouch. The sieve 11 will generally have aperture diameters of from 0.05 to 1 mm. The ends of the stiffening strap 10 project slightly beyond the pouch 11 so as to be more easily insertable into and removed from the guide member 1. The stiffening strap 10 has at the lower end a triangle tip 12 that in the assembling can be introduced through the opening 8 in the guide frame 2.

Figure 7:
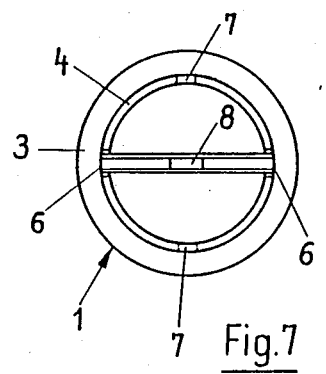
FIG. 7 is a top view of the guide member from the direction of arrow B of FIG. 1.
Figure 8:
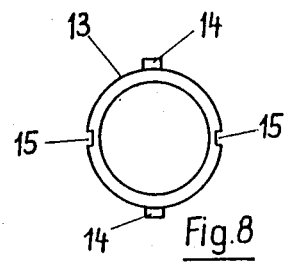
FIG. 8 is a top view of the clamping ring likewise viewed from the same direction.

In FIGS. 3, 6 and 8 is shown a clamping ring 13. The clamping ring 13 has an external diameter such that, after the container 9 is introduced in the guide member 1, it compresses the upper edge of the pouch or sieve 11 against the inner wall of the adapter ring 4. The stiffening strap 10 is at the same time inserted into the guide frame 2 and rests always compactly in the area of the annular lip 3 in the recesses 6 thereof and in the slits 5 of the adapter ring 4.

In order that the clamping ring 13 has a reliable seat, it is provided on opposite sides on the external periphery with two projections 14 that when inserted in the adapter ring 4 of the guide member 1 fit in the apertures 7 of the adapter ring 4. The clamping ring 13 can be additionally provided in the area in which the ends of the stiffening strap 10 are situated in the adapter ring 4 with corresponding flattenings or recesses 15 of small depth for centering or better adjustment.

From FIGS. 1 to 3 it can be seen how the container 9 and the clamping ring 13 can be inserted into the guide member 1.

Figure 9:
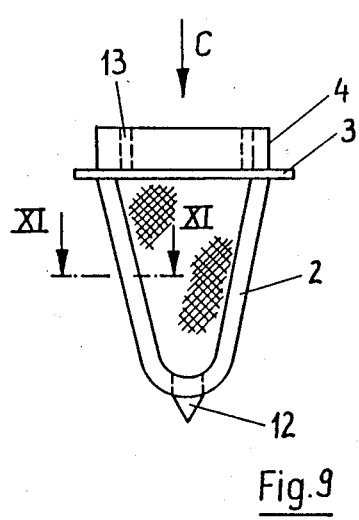
FIG. 9 is a side view of the device according to the invention in assembled state corresponding to the views in FIGS. 1 to 3.
Figure 10:
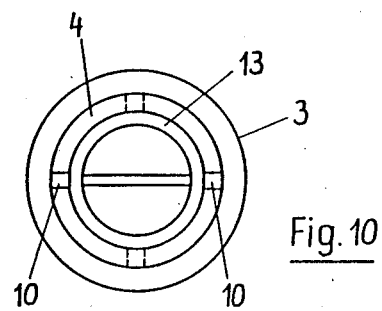
FIG. 10 is a top view on the device according to FIG. 9 from the direction of arrow C in FIG. 9.

FIG. 9 shows the assembled state. As it can be seen, the triangular tip 12 of the stiffening strap 10 here projects downwardly from the guide frame.

As it can further be seen from the figures, the annular lip 3 projects above the container 9 together with stiffening strap 10. The diameter enlargement depends on the particular use intended and on the size of the container. The projecting portion of the annular lip 3, which extends in horizontal direction, has the task of eventually preventing the roots that creep out from the interior of the container 9 from making contact with the soil, or it is absolutely prevented with said annular lip that roots can grow out, since they would immediately dry up for lack of soil and moisture.

I claim:

1. A device for retarding growth of a plant by limiting the nourishment and volume occupied by the plant's roots comrising, a rigidly reinforced container (9) permanently enclosing the soil and the primary roots of the plant, said container having walls that are at least partially perforated, an aperture opening upwardly to allow the plant to grow above the soil, said container having the shape of a pouch with at least one reinforcing member of a curved profile, said device further includes a guide member (1) having an annular lip (3) on the upper end thereof defining an opening wherein said container is received within the opening of the guide member and the ends of the reinforcing member and the container walls are secured to the guide member (1), said annular lip (3) further includes an upwardly extending adapter ring (4) which prevents the root of the plant from extending over the annular lip to embed in the soil outside the container.

2. A device for retarding growth of a plant by limiting the nourishment and volume occupied by the plant's roots comprising, a rigidly reinforced container (9) permanently enclosing the soil and the primary roots of the plant, said container having walls that are at least partially perforated, an aperture opening upwardly to allow the plant to grow above the soil, said container having the shape of a pouch with at least one reinforcing stiffening strap (10) of a curved profile, said device further includes a guide member (1) including a guide frame (2) which surrounds the curved profile of said stiffening strap 10, said guide frame includes an annular lip (3) on the upper end thereof defining an opening wherein said container is received within the opening of the guide member such that the stiffening strap (10) is fitted within the guide frame (2), said annular lip (3) further includes an upwardly extending adapter ring (4) which prevents the root of the plant from extending over the annular lip to embed in the soil outside the container.

3. A device according to claim 2, wherein said annular lip (3) and said adapter ring (4) are made as a single piece.

4. A device according to claim 1, wherein said annular lip (3) and said adapter ring (4) are made as a single piece.

5. A device, for retarding and limiting growth of a plant by limiting cultivation and nourishment of the plant's roots, comprising a pouched container (9) and a guide member (1), said pouched container permanently enclosing soil and the roots of the plant and having walls that are at least partially perforated and said pouched containers further having at least one stiffening strap of curved profile, the guide member (1) having a guide frame (2) surrounding the curved profile of said stiffening strap (10), said guide member (1) further includes an annular lip (3), on the upper end thereof, defining an aperture in which said container (9) is fitted, and said annular lip (3) is provided with an adapter ring (4), for preventing the roots of the plant from being embedded outside the container, and said guide frame (2) of said guide member (1), seen in cross section, has a U-shaped profile in an interior space of which is situated said stiffening strap (10).

6. A device according to claim 5, characterized in that inside said aperture defined by said annular lip (3) is inserted a clamping ring (13) with which the upper edge of said container (9) is clamped between the clamping ring (13) and the interior wall of said annular lip (3).

7. A device according to claim 6, characterized in that said annular lip (3) is provided with one adapter ring (4) the internal diameter of which corresponds at least approximately to the internal diameter of said aperture of said annular lip (3).

8. A device according to claim 7, characterized in that said adapter ring (4) has slits (5) and said annular lip (3) has on the internal diameter recessees (6), said slits (5) and said recesses (6) substantially align to allow passage therethrough of said stiffening strap (10) of said container (9).

9. A device according to claim 5, characterized in that said guide frame (2) of said guide member (1) has in the lower area a downwardly oriented tip (12).

10. A device according to claim 9, characterized in that said stiffening strap (10) of said container (9) is provided at the lower end with said tip (12) and said guide frame (2) of said guide member (1) has at the lower end a slit (8) for passage of said tip (12).

11. A device according to claim 9, characterized in that said tip (12) is triangular in shape and has a downwardly projecting triangular tip.

12. A device according to claim 6, characterized in that said clamping ring (13) is provided on the external periphery with projections (14) and said adapter ring (4) is provided with apertures (7), said projections (14) engaging in said apertures (7).

13. A device according to claim 5, characterized in that said annular lip (3) has a larger external diameter than said container (9) together with said stiffening strap (10).

14. A device according to claim 5, characterized in that said container (9) has in the lower area a downwardly oriented tip (12).

* * * * *